United States Patent
Li et al.

(10) Patent No.: US 10,575,221 B2
(45) Date of Patent: *Feb. 25, 2020

(54) CELL HANDOVER METHOD AND DEVICE

(71) Applicant: HUAWEI TECHNOLOGIES CO., LTD., Shenzhen, Guangdong (CN)

(72) Inventors: Mingchao Li, Beijing (CN); Xin Xiong, Beijing (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

This patent is subject to a terminal disclaimer.

(21) Appl. No.: 15/061,174

(22) Filed: Mar. 4, 2016

(65) Prior Publication Data

US 2016/0192246 A1 Jun. 30, 2016

Related U.S. Application Data

(60) Division of application No. 14/884,360, filed on Oct. 15, 2015, now Pat. No. 9,749,913, which is a
(Continued)

(51) Int. Cl.
*H04W 36/00* (2009.01)
*H04W 76/27* (2018.01)
(Continued)

(52) U.S. Cl.
CPC ....... *H04W 36/0055* (2013.01); *H04W 24/10* (2013.01); *H04W 36/04* (2013.01);
(Continued)

(58) Field of Classification Search
CPC . H04W 36/0055; H04W 24/10; H04W 36/04; H04W 72/14; H04W 76/046; H04W 88/08
(Continued)

(56) References Cited

U.S. PATENT DOCUMENTS

2007/0036109 A1* 2/2007 Kwak ............... H04W 36/0066
370/331
2007/0177510 A1* 8/2007 Natarajan ............. H04W 36/22
370/238
(Continued)

FOREIGN PATENT DOCUMENTS

CN 102469557 5/2012
CN 102883440 1/2013
(Continued)

OTHER PUBLICATIONS

PCT International Search Report dated Jan. 16, 2014 in corresponding International Patent Application No. PCT/CN2013/074252.
(Continued)

*Primary Examiner* — Jae Y Lee
*Assistant Examiner* — Jean F Voltaire
(74) *Attorney, Agent, or Firm* — Leydig, Voit & Mayer, Ltd.

(57) ABSTRACT

Embodiments of the present invention provide a cell handover method and a device. so that the target eNB uses a current serving small node as a user plane serving node after UE is handed over and uses the target eNB as a control plane serving node after the UE is handed over; receiving a handover request acknowledgment sent by the target eNB; and sending offloading configuration information of the current serving small node to the current serving small node, and sending RRC reconfiguration information of the UE to the UE, so that offloading configuration is performed separately by the current serving small node and the UE. This avoids a problem that in a cell handover process, a transmission resource required for transmission increases and a delay is relatively great because the current serving small node forwards a large amount of data to the target eNB.

14 Claims, 8 Drawing Sheets

Related U.S. Application Data continuation of application No. PCT/CN2013/074252, filed on Apr. 16, 2013.

(51) Int. Cl.
*H04W 36/04* (2009.01)
*H04W 24/10* (2009.01)
*H04W 72/14* (2009.01)
*H04W 88/02* (2009.01)
*H04W 88/08* (2009.01)

(52) U.S. Cl.
CPC ........... *H04W 72/14* (2013.01); *H04W 76/27* (2018.02); *H04W 88/02* (2013.01); *H04W 88/08* (2013.01)

(58) Field of Classification Search
USPC .......................................................... 370/331
See application file for complete search history.

(56) References Cited

U.S. PATENT DOCUMENTS

| | | | |
|---|---|---|---|
| 2008/0153495 A1 | 6/2008 | Ogami et al. | |
| 2008/0214190 A1 | 9/2008 | Aalto | |
| 2009/0092097 A1* | 4/2009 | Nylander | H04W 36/0061 370/331 |
| 2010/0105384 A1 | 4/2010 | Vachhani | |
| 2010/0215018 A1 | 8/2010 | Ejzak | |
| 2010/0290430 A1 | 11/2010 | Lee | |
| 2010/0304748 A1 | 12/2010 | Henttonen et al. | |
| 2010/0309886 A1 | 12/2010 | Vikberg | |
| 2010/0329206 A1 | 12/2010 | Thome et al. | |
| 2011/0002304 A1* | 1/2011 | Lee | H04W 36/02 370/331 |
| 2011/0075675 A1 | 3/2011 | Koodli | |
| 2012/0082090 A1 | 4/2012 | Horn et al. | |
| 2012/0142354 A1 | 6/2012 | Ahluwalla | |
| 2012/0236827 A1* | 9/2012 | Izawa | H04W 36/0005 370/331 |
| 2012/0314569 A1 | 12/2012 | Liu et al. | |
| 2013/0084795 A1 | 4/2013 | Van Phan | |
| 2013/0084892 A1 | 4/2013 | Teyeb et al. | |
| 2013/0143574 A1 | 6/2013 | Teyeb | |
| 2013/0203416 A1 | 8/2013 | Raaf | |
| 2014/0004863 A1* | 1/2014 | Zhang | H04W 36/0033 455/444 |
| 2014/0128092 A1 | 5/2014 | Xiong et al. | |
| 2014/0194127 A1 | 7/2014 | Wang et al. | |
| 2014/0301360 A1* | 10/2014 | Bontu | H04W 36/0083 370/331 |
| 2015/0365872 A1* | 12/2015 | Dudda | H04W 36/0055 455/436 |

FOREIGN PATENT DOCUMENTS

| | | |
|---|---|---|
| CN | 103002527 | 3/2013 |
| WO | WO2011/13384 | 11/2011 |

OTHER PUBLICATIONS

Notice of Allowance, dated Dec. 7, 2015, in U.S. Appl. No. 14/884,360.

U.S. Appl. No. 14/884,360, filed Oct. 15, 2015, Mingchao Li et al., Huawei Technologies Co., Ltd.

Partial Supplementary European Search Report, dated Mar. 2, 2016, in corresponding European Application No. 13882373.7 (9 pp.).

3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.5.0, Mar. 2013, pp. 1-209.

Office Action, dated Jul. 12, 2016, in U.S. Appl. No. 14/884,360 (38 pp.).

Extended European Search Report dated May 31, 2016 in corresponding European Patent Application No. 13882373.7.

"Discussion on Protocol Stack Support in Small Cell eNB", 3GPP TSG RAN WG2 #81, Jan. 28-Feb. 1, 2013, St Julian's, Malta, 7 pages.

Final Office Action, dated Jan. 4, 2017, in U.S. Appl. No. 14/884,360 (35 pp.).

Notice of Allowance, dated Apr. 27, 2017, in U.S. Appl. No. 14/884,360 (13 pp.).

3$^{rd}$ Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.3.0 (Mar. 2013), pp. 1-344.

3$^{rd}$ Generation Partnership Project; Technical Specification Group Radio Access Network; Evolved Universal Terrestrial Radio Access Network (E-UTRAN); X2 application protocol (X2AP) (Release 11), 3GPP TS 36.423 V11.4.0 (Mar. 2013), pp. 1-144.

EP/19160762, Search Report, dated Aug. 9, 2019.

U.S. Appl. No. 14/884,360, filed Oct. 15, 2015.

"Deployment scenarios and design goals for dual connectivity," 3GPP TSG-RAN WG2 #81, St. Julian's, Malta, R2-130444, pp. 1-6, 3rd Generation Partnership Project, Valbonne, France (Jan. 28-Feb. 1, 2013).

* cited by examiner

CELL HANDOVER METHOD AND DEVICE

CROSS-REFERENCE TO RELATED APPLICATIONS

This application is a divisional application of U.S. patent application Ser. No. 14/884,360, filed on Oct. 15, 2015, which is a continuation of International Application No. PCT/CN2013/074252, filed on Apr. 16, 2013. The aforementioned patent applications are hereby incorporated by reference in their entireties.

TECHNICAL FIELD

Embodiments of the present invention relate to communications technologies, and in particular, to a cell handover method and a device.

BACKGROUND

As mobile communications technologies develop rapidly, mobile data service traffic also increases sharply. To resolve a problem that the mobile data service traffic increases sharply, operators propose use of a small cell for offloading, that is, in a location with a relatively large quantity of mobile users, small cells with a relatively small coverage area are intensively deployed, so as to support enormous services generated in this area. An access node of the small cell is referred to as a small node, where the small node may be a low power node (LPN, Low Power Node), a femtocell (Femto), a low mobility cell (LoMo), a pico cell (pico), or the like.

The small node is generally deployed in an edge area of a macro base station. When user equipment (UE, User Equipment) is located in an area covered synchronously by the macro base station and the small node, an offloading transmission scheme may be used, that is, control plane signaling of the UE is transmitted in a source eNB (eNB, evolved Node B), and user plane data is transmitted in the small node. To perform a cell handover, the source eNB selects a target eNB for the UE according to a measurement result of the UE and radio resource management (RRM, Radio Resource Management) information. To ensure continuity and lossless transmission of a service, the source eNB switches a control plane and a user plane of the UE to those of the target eNB, and meanwhile, the LPN forwards, to the target eNB, user plane data of the UE buffered in a buffer.

However, because data stored in a buffer of the small node greatly increases user plane data is offloaded to the small cell, when the cell handover is being performed, a current serving small node needs to forward the data to the target eNB; therefore, a transmission resource required for transmission also increases, and a delay is relatively great.

SUMMARY

Embodiments of the present invention provide a cell handover method and a device, so as to avoid a problem that in a cell handover process, a transmission resource required for transmission increases and a delay is relatively great because a small node forwards a large amount of data to a target eNB.

According to a first aspect, the present invention provides a cell handover method, including:

sending a handover request to a target eNB eNB, where the handover request includes a context of a current serving small node, a context of user equipment UE, and an offloading indication, so that the target eNB uses the current serving small node as a user plane serving node after the UE is handed over, and uses the target eNB as a control plane serving node after the UE is handed over;

receiving a handover request acknowledgment sent by the target eNB, where the handover request acknowledgment includes radio resource control RRC reconfiguration information of the UE and offloading configuration information of the current serving small node, and the handover request acknowledgment is sent after the target eNB determines that the UE can be handed over, that the current serving small node can serve as the user plane serving node after the UE is handed over, and that the target eNB can serve as the control plane serving node after the UE is handed over; and sending the offloading configuration information of the current serving small node to the current serving small node, and sending the RRC reconfiguration information of the UE to the UE, so that offloading configuration is performed separately by the current serving small node and the UE.

In a first possible implementation manner of the first aspect, before the sending a handover request to a target eNB eNB, the method includes:

determining, according to a measurement report of the UE and radio resource management RRM information, one eNB from a pre-obtained small node sharing list as the target eNB to which the UE is to be handed over, where the small node sharing list includes identities IDs of multiple eNBs that share the current serving small node; or determining, according to the measurement report of the UE and the RRM information, one eNB as the target eNB to which the UE is to be handed over.

In a second possible implementation manner of the first aspect, the context of the current serving small node includes:

an identity of the current serving small node.

According to the second possible implementation manner of the first aspect, in a third possible implementation manner, the context of the current serving small node further includes:

a use frequency and system information that are of the current serving small node, and a security algorithm supported by the current serving small node.

According to a second aspect, the present invention provides a cell handover method, including:

receiving a handover request sent by a source eNB eNB, where the handover request includes a context of a current serving small node, a context of user equipment UE, and an offloading indication;

determining, according to the handover request, whether the UE can be handed over, whether the current serving small node can serve as a user plane serving node after the UE is handed over, and whether a target eNB can serve as a control plane serving node after the UE is handed over, and if the UE can be handed over, the current serving small node can serve as the user plane serving node after the UE is handed over, and the target eNB can serve as the control plane serving node after the UE is handed over, generating radio resource control RRC reconfiguration information of the UE and offloading configuration information of the current serving small node; and sending, to the source eNB, a handover request acknowledgment that carries the RRC reconfiguration information of the UE and the offloading configuration information of the current serving small node, so that the source eNB sends the RRC reconfiguration information of the UE to the UE and sends the offloading configuration information of the current serving small node to the current serving small node.

In a first possible implementation manner of the second aspect, after the sending, to the source eNB, a handover request acknowledgment that carries the RRC reconfiguration information of the UE and the offloading configuration information of the current serving small node, the method further includes:

receiving an uplink synchronization message that is sent by the UE after the UE completes offloading configuration according to the RRC reconfiguration information of the UE, and delivering a timing advance TA and an uplink grant to the UE; and receiving an offloading configuration success message sent by the UE based on the TA and the uplink grant.

According to the first possible implementation manner of the second aspect, in a second possible implementation manner, after the receiving an offloading configuration success message sent by the UE based on the TA and the uplink grant, the method further includes:

sending the UE offloading configuration success indication to the current serving small node, so that the current serving small node confirms that the UE completes the offloading configuration.

According to a third aspect, the present invention provides a cell handover method, including:

receiving offloading configuration information sent by a source eNB eNB, where the offloading configuration information is sent after the source eNB receives a handover request acknowledgment sent by a target eNB to which user equipment UE is to be handed over, and the offloading configuration information includes configuration information required for establishing a bearer with the target eNB and configuration information required for establishing a user plane connection to the UE;

performing offloading configuration according to the offloading configuration information, buffering user plane data of the UE, and recording a sending status of the user plane data of the UE; and after confirming that the UE completes the offloading configuration, sending the buffered user plane data of the UE according to configuration information obtained after offloading configuration of a small node and the sending status of the user plane data of the UE.

In a first possible implementation manner of the third aspect, the confirming that the UE completes the offloading configuration includes:

receiving a UE offloading configuration success indication sent by the target eNB; and confirming, according to the UE offloading configuration success indication, that the UE completes the offloading configuration.

In a second possible implementation manner of the third aspect, the confirming that the UE completes the offloading configuration includes:

receiving an uplink synchronization message sent by the UE, and delivering a timing advance TA and an uplink grant to the UE;

receiving an offloading configuration success message sent by the UE based on the TA and the uplink grant; and confirming, according to the offloading configuration success message, that the UE completes the offloading configuration.

With reference to the third aspect or either of the possible implementation manners of the third aspect, in a third possible implementation manner, the buffered user plane data of the UE includes buffered uplink user plane data and buffered downlink user plane data; and the sending the buffered user plane data of the UE according to configuration information obtained after offloading configuration of a small node and the sending status of the user plane data of the UE includes:

sending the buffered downlink user plane data to the UE and the buffered uplink user plane data to the target eNB according to the configuration information obtained after the offloading configuration of the small node and the sending status of the user plane data of the UE.

According to the third possible implementation manner of the third aspect, in a fourth possible implementation manner, the buffered downlink user plane data includes downlink user plane data from the source eNB and downlink user plane data from the target eNB; and the sending the buffered downlink user plane data to the UE according to the configuration information obtained after the offloading configuration of the small node and the sending status of the user plane data of the UE includes:

sending, to the UE, the downlink user plane data from the source eNB according to the configuration information obtained after the offloading configuration of the small node and the sending status of the user plane data of the UE; and after sending the downlink user plane data from the source eNB is completed, sending, to the UE, the downlink user plane data from the target eNB according to the configuration information obtained after the offloading configuration of the small node and the sending status of the user plane data of the UE.

According to a fourth aspect, the present invention provides an eNB, including:

a sending module, configured to send a handover request to a target eNB eNB, where the handover request includes a context of a current serving small node, a context of user equipment UE, and an offloading indication, so that the target eNB uses the current serving small node as a user plane serving node after the UE is handed over, and uses the target eNB as a control plane serving node after the UE is handed over; and a receiving module, configured to receive a handover request acknowledgment sent by the target eNB, where the handover request acknowledgment includes radio resource control RRC reconfiguration information of the UE and offloading configuration information of the current serving small node, and the handover request acknowledgment is sent after the target eNB determines that the UE can be handed over, that the current serving small node can serve as the user plane serving node after the UE is handed over, and that the target eNB can serve as the control plane serving node after the UE is handed over; where the sending module is further configured to: send the offloading configuration information of the current serving small node to the current serving small node, and send the RRC reconfiguration information of the UE to the UE, so that offloading configuration is performed separately by the current serving small node and the UE.

In a first possible implementation manner of the fourth aspect, the eNB further includes:

a determining module, configured to: determine, according to a measurement report of the UE and radio resource management RRM information, one eNB from a pre-obtained small node sharing list as the target eNB to which the UE is to be handed over, where the small node sharing list includes identities IDs of multiple eNBs that share the current serving small node; or configured to determine, according to the measurement report of the UE and the RRM information, one eNB as the target eNB to which the UE is to be handed over.

In a second possible implementation manner of the fourth aspect, the context of the current serving small node includes:

an identity of the current serving small node.

According to the second possible implementation manner of the fourth aspect, in a third possible implementation manner, the context of the current serving small node further includes:

a use frequency and system information that are of the current serving small node, and a security algorithm supported by the current serving small node.

According to a fifth aspect, the present invention provides an eNB, including:

a receiving module, configured to receive a handover request sent by a source eNB eNB, where the handover request includes a context of a current serving small node, a context of user equipment UE, and an offloading indication;

a judging module, configured to: determine, according to the handover request, whether the UE can be handed over, whether the current serving small node can serve as a user plane serving node after the UE is handed over, and whether a target eNB can serve as a control plane serving node after the UE is handed over, and if the UE can be handed over, the current serving small node can serve as the user plane serving node after the UE is handed over, and the target eNB can serve as the control plane serving node after the UE is handed over, generate radio resource control RRC reconfiguration information of the UE and offloading configuration information of the current serving small node; and a sending module, configured to send, to the source eNB, a handover request acknowledgment that carries the RRC reconfiguration information of the UE and the offloading configuration information of the current serving small node, so that the source eNB sends the RRC reconfiguration information of the UE to the UE and sends the offloading configuration information of the current serving small node to the current serving small node.

In a first possible implementation manner of the fifth aspect, the receiving module is further configured to receive an uplink synchronization message that is sent by the UE after the UE completes offloading configuration according to the RRC reconfiguration information of the UE;

the sending module is further configured to deliver a time advance TA and an uplink grant to the UE; and the receiving module is further configured to receive an offloading configuration success message sent by the UE based on the TA and the uplink grant.

According to the first possible implementation manner of the fifth aspect, in a second possible implementation manner, the sending module is further configured to send the UE offloading configuration success indication to the current serving small node, so that the current serving small node confirms that the UE completes the offloading configuration.

According to a sixth aspect, the present invention provides a small node, including:

a receiving module, configured to receive offloading configuration information sent by a source eNB eNB, where the offloading configuration information is sent after the source eNB receives a handover request acknowledgment sent by a target eNB to which user equipment UE is to be handed over, and the offloading configuration information includes configuration information required for establishing a bearer with the target eNB and configuration information required for establishing a user plane connection to the UE;

a buffering module, configured to: perform offloading configuration according to the offloading configuration information, buffer user plane data of the UE, and record a sending status of the user plane data of the UE; and a sending module, configured to: after it is confirmed that the UE completes the offloading configuration, send, according to configuration information obtained after offloading configuration of the small node and the sending status of the user plane data of the UE, the user plane data of the UE buffered by the buffering module.

In a first possible implementation manner of the sixth aspect, the receiving module is further configured to receive a UE offloading configuration success indication sent by the target eNB; and the small node further includes: a first confirming module, configured to confirm, according to the UE offloading configuration success indication, that the UE completes the offloading configuration.

In a second possible implementation manner of the sixth aspect, the receiving module is further configured to receive an uplink synchronization message sent by the UE, and the sending module is further configured to deliver a timing advance TA and an uplink grant to the UE;

the receiving module is further configured to receive an offloading configuration success message sent by the UE based on the TA and the uplink grant; and the small node further includes: a second confirming module, configured to confirm, according to the offloading configuration success message, that the UE completes the offloading configuration.

With reference to the sixth aspect or either of the possible implementation manners of the sixth aspect, in a third possible implementation manner, the user plane data of the UE buffered by the buffering module includes buffered uplink user plane data and buffered downlink user plane data; and the sending module is specifically configured to: after it is confirmed that the UE completes the offloading configuration, according to the configuration information obtained after the offloading configuration of the small node and the sending status that is of the user plane data of the UE and is recorded by the buffering module, send, to the UE, the downlink user plane data buffered by the buffering module, and send, to the target eNB, the uplink user plane data buffered by the buffering module.

According to the third possible implementation manner of the sixth aspect, in a fourth possible implementation manner, the downlink user plane data buffered by the buffering module includes downlink user plane data from the source eNB and downlink user plane data from the target eNB; and the sending module is specifically configured to: after it is confirmed that the UE completes the offloading configuration, send, to the UE, the downlink user plane data from the source eNB according to the configuration information obtained after the offloading configuration of the small node and the sending status that is of the user plane data of the UE and is recorded by the buffering module; and after sending the downlink user plane data from the source eNB is completed, send, to the UE, the downlink user plane data from the target eNB according to the configuration information obtained after the offloading configuration of the small node and the sending status that is of the user plane data of the UE and is recorded by the buffering module.

According to the cell handover method and the device provided by the embodiments of the present invention, a handover request is sent to a target eNB, where the handover request includes a context of a current serving small node, a context of UE, and an offloading indication, so that the target eNB uses the current serving small node as a user plane serving node after the UE is handed over and uses the target eNB as a control plane serving node after the UE is handed over. In this way, transmission of user plane data is always maintained in the current serving small node, and a control plane is switched from a source eNB to the target eNB, thereby resolving a problem that in a cell handover process, a transmission resource required for transmission increases and a delay is relatively great because the current serving small node forwards a large amount of data to the target eNB.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
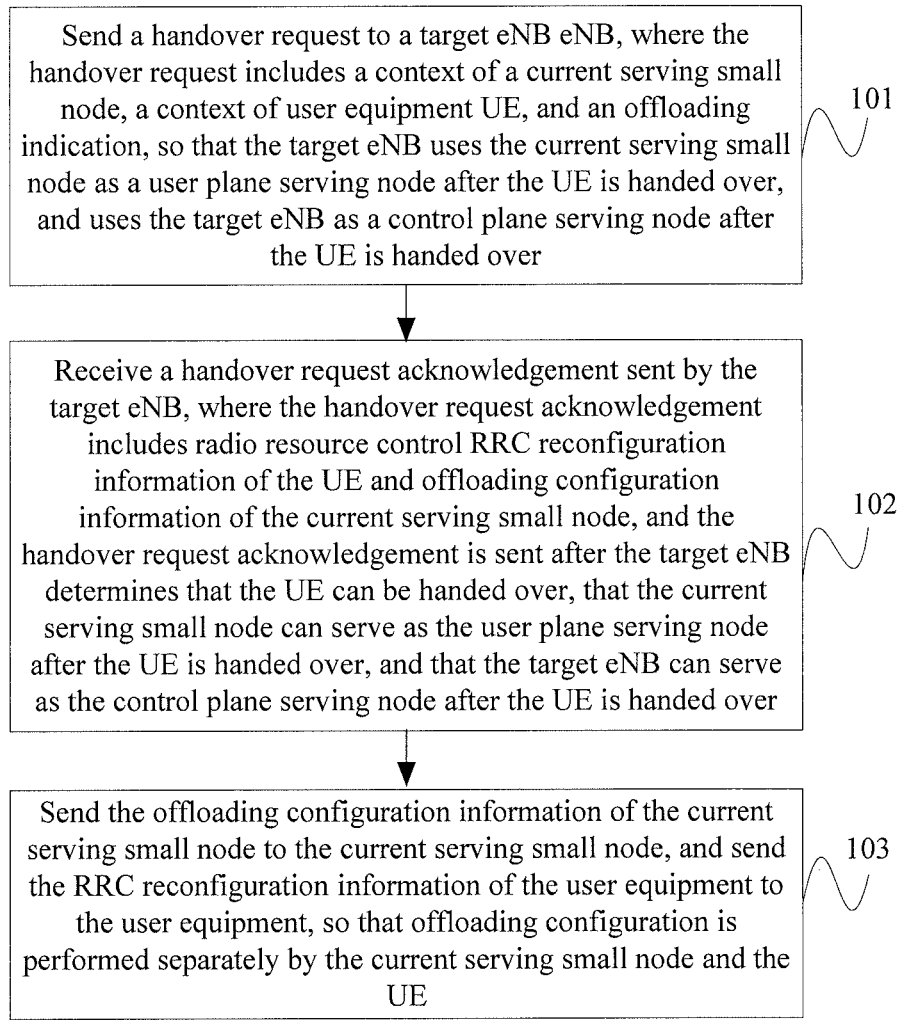
FIG. 1 is a flowchart of Embodiment 1 of a cell handover method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA, Frequency Division Multiple Access) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other communications systems.

User equipment involved in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

A base station involved in this application is a generalized base station, includes functions of radio resource management and data scheduling, may include a radio network controller (Radio Network Controller, RNC), and may further include a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS, Base Transceiver Station) in GSM or the CDMA, may also be a base station (NodeB) in WCDMA, and may further be an evolved NodeB (NodeB, eNB, or e-NodeB, evolved Node B) in the LTE, which is not limited in the this application.

In embodiments of the present invention, an interface between an eNB and UE is defined as an interface Uu, an interface between a small node and the UE as an interface Uu', and an interface between the eNB and the small node as an interface X3. A cell handover method of the present invention may be applied to a scenario in which the UE is located in an area covered synchronously by a macro eNB and the small node. The sequence numbers of the following embodiments of the present invention are merely for description, and do not imply the preference among the embodiments.

FIG. 1 is a flowchart of Embodiment 1 of a cell handover method according to the present invention. As shown in FIG. 1, the cell handover method provided in this embodiment is executed by a source eNB, and the cell handover method of this embodiment may include:

S101. Send a handover request to a target eNB eNB, where the handover request includes a context of a current serving small node, a context of user equipment UE, and an offloading indication, so that the target eNB uses the current serving small node as a user plane serving node after the UE is handed over, and uses the target eNB as a control plane serving node after the UE is handed over.

Specifically, the current serving small node may be an LPN, a Femto, a LoMo, a pico or the like. The current serving small node refers to a small node that currently provides a user plane service for the UE. The current serving small node may be a small node located in an area covered by multiple macro eNBs.

Further, the context of the current serving small node may include an identity of the current serving small node, may further include a use frequency and system information that are of the current serving small node and a security algorithm supported by the current serving small node, and may also include, in the handover request, an information element (Information Element, IE for short) that is used to uniquely define, on an interface X3, a serial number of the UE.

It should be noted that when a signal quality of a cell does not meet a requirement, the UE sends a corresponding measurement report to the source eNB, and after receiving the measurement report of the UE and RRM information, the source eNB determines one eNB as the target eNB to which the UE is to be handed over. Optionally, the source eNB may determine one eNB from a pre-obtained small node sharing list as the target eNB to which the UE is to be handed over, where the small node sharing list includes identities (ID, Identity) of multiple eNBs that share a current serving small node. The small node sharing list may be created by the current serving small node or by operation, administration and maintenance OAM (operation, administration and maintenance). The current serving small node stores the small node sharing list and transmits, by using the interface X3, the small node sharing list to each eNB that shares the current serving small node. Further, when a change occurs in the small node sharing list, that is, a change occurs in eNBs that share the current serving small node, the current serving small node may further update the small node sharing list and transmit the small node sharing list to each eNB that currently shares the resource of the current serving small node.

Optionally, the source eNB may also determine, according to the measurement report of the UE and the RRM information, one eNB as the target eNB to which the UE is to be handed over, so that the target eNB uses the current serving small node as the user plane serving node after the UE is handed over and uses the target eNB as the control plane serving node after the UE is handed over.

S102. Receive a handover request acknowledgment sent by the target eNB, where the handover request acknowledgment includes radio resource control RRC reconfiguration information of the UE and offloading configuration information of the current serving small node, and the handover request acknowledgment is sent after the target eNB determines that the UE can be handed over, that the current serving small node can serve as the user plane serving node after the UE is handed over, and that the target eNB can serve as the control plane serving node after the UE is handed over.

Specifically, the RRC reconfiguration information of the UE may include UE side configuration information related to establishment of a user plane connection to the current serving small node and configuration information required for establishing a control plane connection to the target eNB. The UE side configuration information related to the establishment of the user plane connection to the current serving small node may include a physical cell identifier (PCI, Physical Cell Identifier) of the current serving small node, system information, a frequency, a data radio bearer (DRB, Data Radio Bearer), configurations of a transmission channel and a physical channel, and an access preamble exclusive for the current serving small node, where the system information, the frequency, the data radio bearer, and the configurations of the transmission channel and the physical channel are used by the current serving small node. The configuration information required for establishing the control plane connection to the target eNB may include an access preamble exclusive for the target eNB. The offloading configuration information of the current serving small node may include configuration information required for establishing a user plane connection to the UE and configuration information required for establishing a bearer with the target eNB. Configuration information required for establishing the user plane connection to the UE may include configurations of a logical channel, a transmission channel, and a physical channel, a new security algorithm identifier, and a new key. The configuration information required for establishing the bearer with the target eNB may include configurations of a logical channel, a transmission channel, and a physical channel, a new security algorithm identifier, and a new key that are related to the interface X3.

S103. Send the offloading configuration information of the current serving small node to the current serving small node, and send the RRC reconfiguration information of the UE to the UE, so that offloading configuration is performed separately by the current serving small node and the UE.

Specifically, after receiving the handover request acknowledgment, the source eNB sends the offloading configuration information of the current serving small node to the current serving small node, and sends the RRC reconfiguration information of the UE to the UE at the same time, so that the offloading configuration is performed separately by the current serving small node and the UE.

According to the cell handover method provided in this embodiment, a handover request is sent to a target eNB, where the handover request includes a context of a current serving small node, a context of UE, and an offloading indication, so that the target eNB uses the current serving small node as a user plane serving node after the UE is handed over and uses the target eNB as a control plane serving node after the UE is handed over. In this way, transmission of user plane data is always maintained in the current serving small node, and a control plane is switched from a source eNB to the target eNB, thereby resolving a problem that in a cell handover process, a transmission resource required for transmission increases and a delay is relatively great because the current serving small node forwards a large amount of data to the target eNB.

Figure 2:
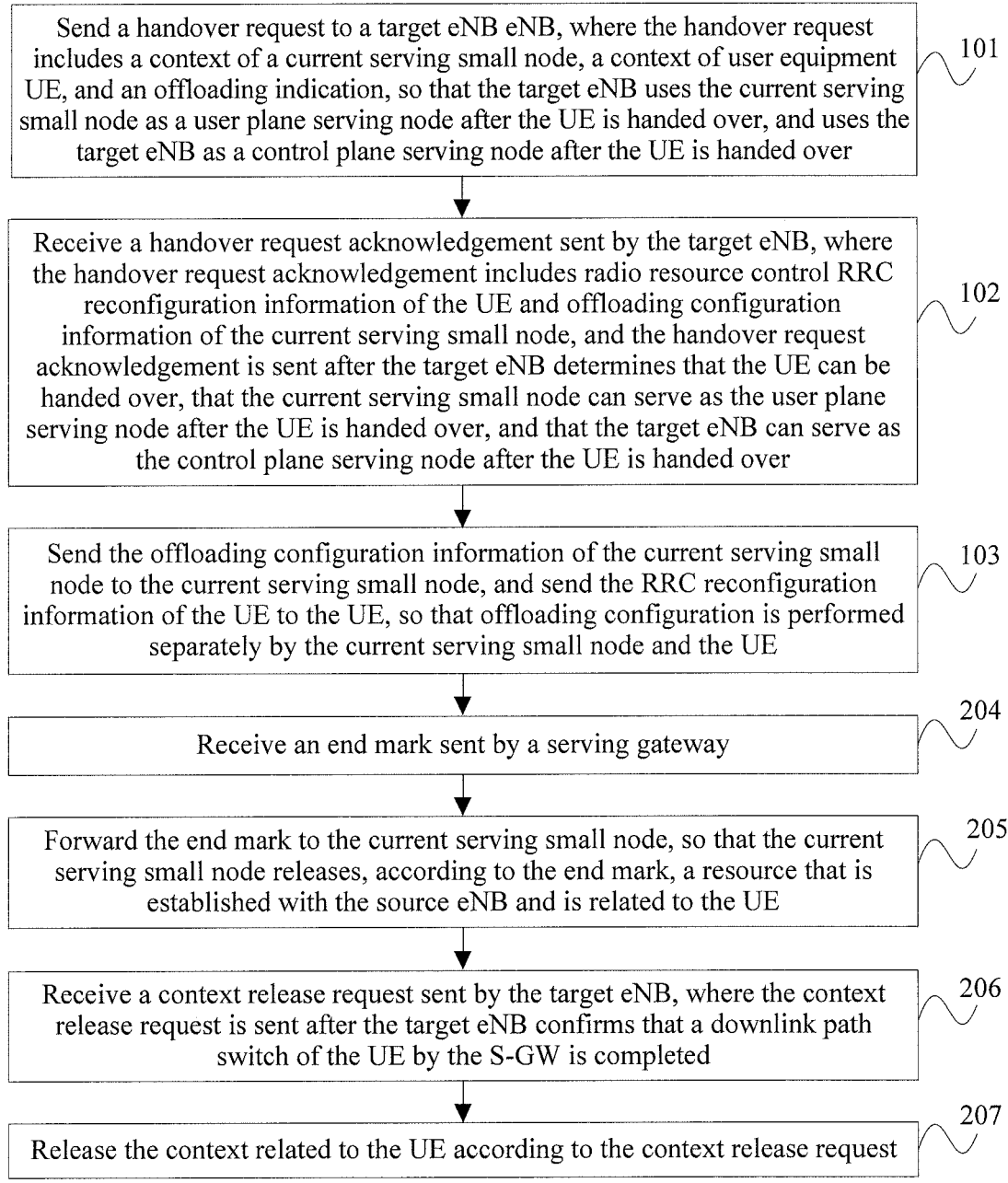
FIG. 2 is a flowchart of Embodiment 2 of a cell handover method according to the present invention.

FIG. 2 is a flowchart of Embodiment 2 of a cell handover method according to the present invention. As shown in FIG. 2, the cell handover method provided in this embodiment is executed by a source eNB, and on the basis of the foregoing embodiment, after step S103, the cell handover method of this embodiment may also include:

S204. Receive an end mark sent by a serving gateway (S-GW, Serving Gateway).

Generally, after completing the offloading configuration, the UE sends an offloading configuration success message to the target eNB; the target eNB sends a path switch request to a mobility management entity (MME, Mobility Management Entity) so as to indicate that a serving cell of the UE has changed; the MME sends a bearer modifying request to the S-GW, and the S-GW switches a sending path of downlink data to the target eNB and sends several end marks to the source eNB.

S205. Forward the end mark to the current serving small node, so that the current serving small node releases, according to the end mark, a resource that is established with the source eNB and that is related to the UE.

Specifically, after receiving the end mark and confirming that the source eNB does not have a resource to deliver, the current serving small node releases the resource that is established with the source eNB and that is related to the UE, for example, an X3 interface resource.

S206. Receive a context release request sent by the target eNB, where the context release request is sent after the target eNB confirms that a downlink path switch of the LTE by the S-GW is completed.

Generally, after receiving the offloading configuration success message of the UE, the target eNB sends the path switch request to the MME. When the target eNB receives a path switch request acknowledgment sent by the MME, the target eNB sends the context release request to the source eNB.

S207. Release the context related to the UE according to the context release request.

Optionally, when receiving the end mark forwarded in S205, the current serving small node may not release the resource that is established between the current serving small node and the source eNB and that is related to the UE either; instead, after S207, and after the source eNB receives the context release request sent by the target eNB and releases the context related to the UE, the source eNB sends a resource release request to the current serving small node, so that the current serving small node releases the resource that is established with the source eNB and that is related to the UE.

According to the cell handover method provided in this embodiment, on the basis of Embodiment 1, a handover request acknowledgment sent by a target eNB to a source eNB carries UE side configuration information related to establishment of a user plane connection to a current serving small node, so that offloading configuration is performed separately by UE and the current serving small node; after the UE and the current serving small node complete the offloading configuration, the current serving small node releases a resource that is established between the current serving small node and the source eNB and that is related to the UE, and the source eNB releases a context related to the UE, thereby saving a resource.

Figure 3:
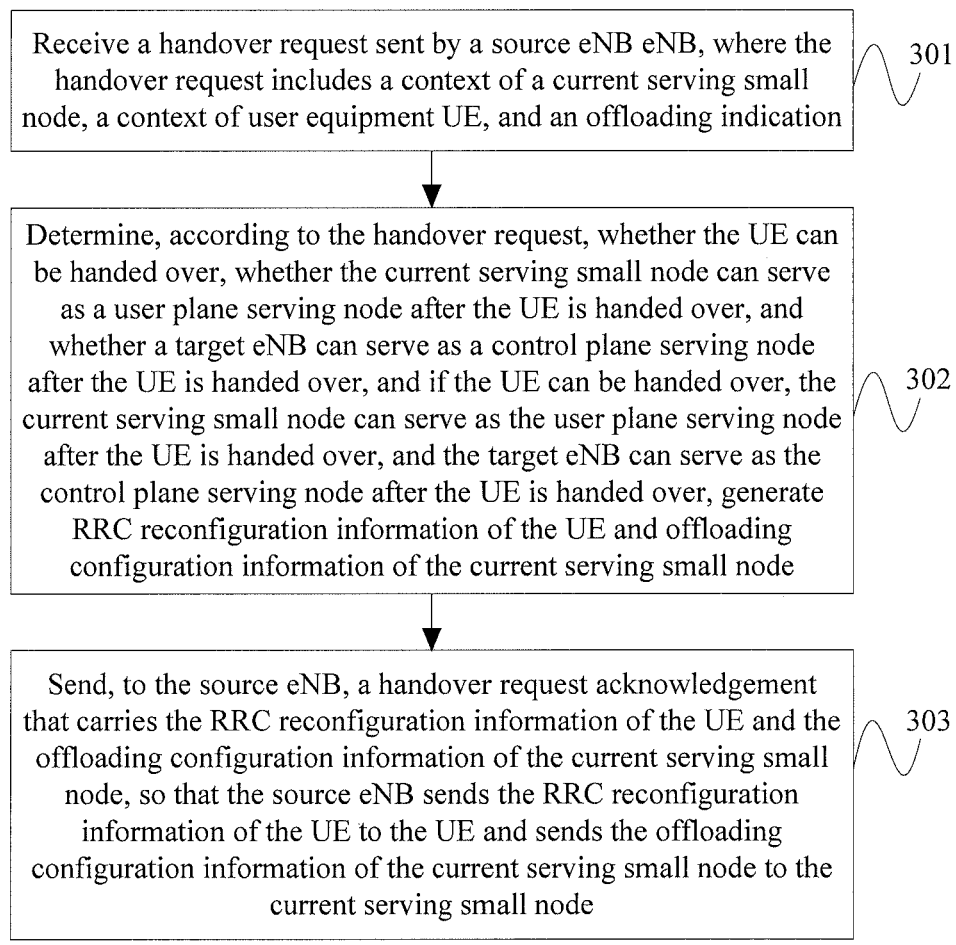
FIG. 3 is a flowchart of Embodiment 3 of a cell handover method according to the present invention.

FIG. 3 is a flowchart of Embodiment 3 of a cell handover method according to the present invention. As shown in FIG. 3, the cell handover method provided in this embodiment is executed by a target eNB, and the cell handover method of this embodiment may include:

S301. Receive a handover request sent by a source eNB, where the handover request includes a context of a current serving small node, a context of user equipment UE, and an offloading indication.

Specifically, the handover request may further include a use frequency and system information that are of the current serving small node and a security algorithm supported by the current serving small node. The handover request may further include an information element that is used to uniquely define, on interface X3, a serial number of the UE.

S302. Determine, according to the handover request, whether the UE can be handed over, whether the current serving small node can serve as a user plane serving node after the UE is handed over, and whether a target eNB can serve as a control plane serving node after the UE is handed over, and if the UE can be handed over, the current serving small node can serve as the user plane serving node after the UE is handed over, and the target eNB can serve as the control plane serving node after the UE is handed over, generate RRC reconfiguration information of the UE and offloading configuration information of the current serving small node.

Specifically, the RRC reconfiguration information of the UE and the offloading configuration information of the current serving small node are generated only when it is determined that the UE can be handed over, that the current serving small node can serve as the user plane serving node after the UE is handed over, and that the target eNB can serve as the control plane serving node after the UE is handed over. If it is determined that the UE cannot be handed over, a reason why a handover cannot be completed is indicated in handover request acknowledgment information; if it is determined that the UE can be handed over, but the current serving small node cannot serve as the user plane serving node after the UE is handed over, the source eNB is instruct to switch a control plane and a user plane of the UE to those of the target eNB, and forward user plane data buffered by the current serving small node.

S303. Send, to the source eNB, a handover request acknowledgment that carries the RRC reconfiguration information of the UE and the offloading configuration information of the current serving small node, so that the source eNB sends the RRC reconfiguration information of the UE to the UE and sends the offloading configuration information of the current serving small node to the current serving small node.

Specifically, the RRC reconfiguration information of the UE may include UE side configuration information related to establishment of a user plane connection to the current serving small node and configuration information required for establishing a control plane connection to the target eNB. The UE side configuration information related to the establishment of the user plane connection to the current serving small node may include a PCI of the current serving small node, system information, a frequency, a DRB, configurations of a transmission channel and a physical channel, and an access preamble exclusive for the current serving small node, where the system information, the frequency, the DRB, and the configurations of the transmission channel and the physical channel are used by the current serving small node. The configuration information required for establishing the control plane connection to the target eNB may include an access preamble exclusive for the target eNB. The offloading configuration information of the current serving small node may include configuration information required for establishing a user plane connection to the UE and configuration information required for establishing a bearer with the target eNB. The configuration information required for establishing the user plane connection to the UE may include configurations of a logical channel, a transmission channel, and a physical channel, a new security algorithm identifier, and a new key that are related to an interface Uu'.

The configuration information required for establishing the bearer with the target eNB may include configurations of a logical channel, a transmission channel, and a physical channel, a new security algorithm identifier, and a new key that are related to the interface X3.

According to the cell handover method provided in this embodiment. After receiving a handover request, a target eNB determines whether a handover can be performed, whether a current serving small node can serve as a user plane serving node after the UE is handed over, and whether the target eNB can serve as a control plane serving node after the UE is handed over, and if a handover can be performed, the current serving small node can serve as the user plane serving node after the UE is handed over, and the target eNB can serve as the control plane serving node after the UE is handed over, generates RRC reconfiguration information of the UE and offloading configuration information of the current serving small node, and sends, to a source eNB, a handover request acknowledgment that carries the RRC reconfiguration information of the UE and the offloading configuration information of the current serving small node, so as to perform a cell handover. In this way, transmission of user plane data is always maintained in the current serving small node, and a control plane is switched from the source eNB to the target eNB, thereby resolving a problem that in a cell handover process, a transmission resource required for transmission increases and a delay is relatively great because the current serving small node forwards a large amount of data to the target eNB.

Figure 4:
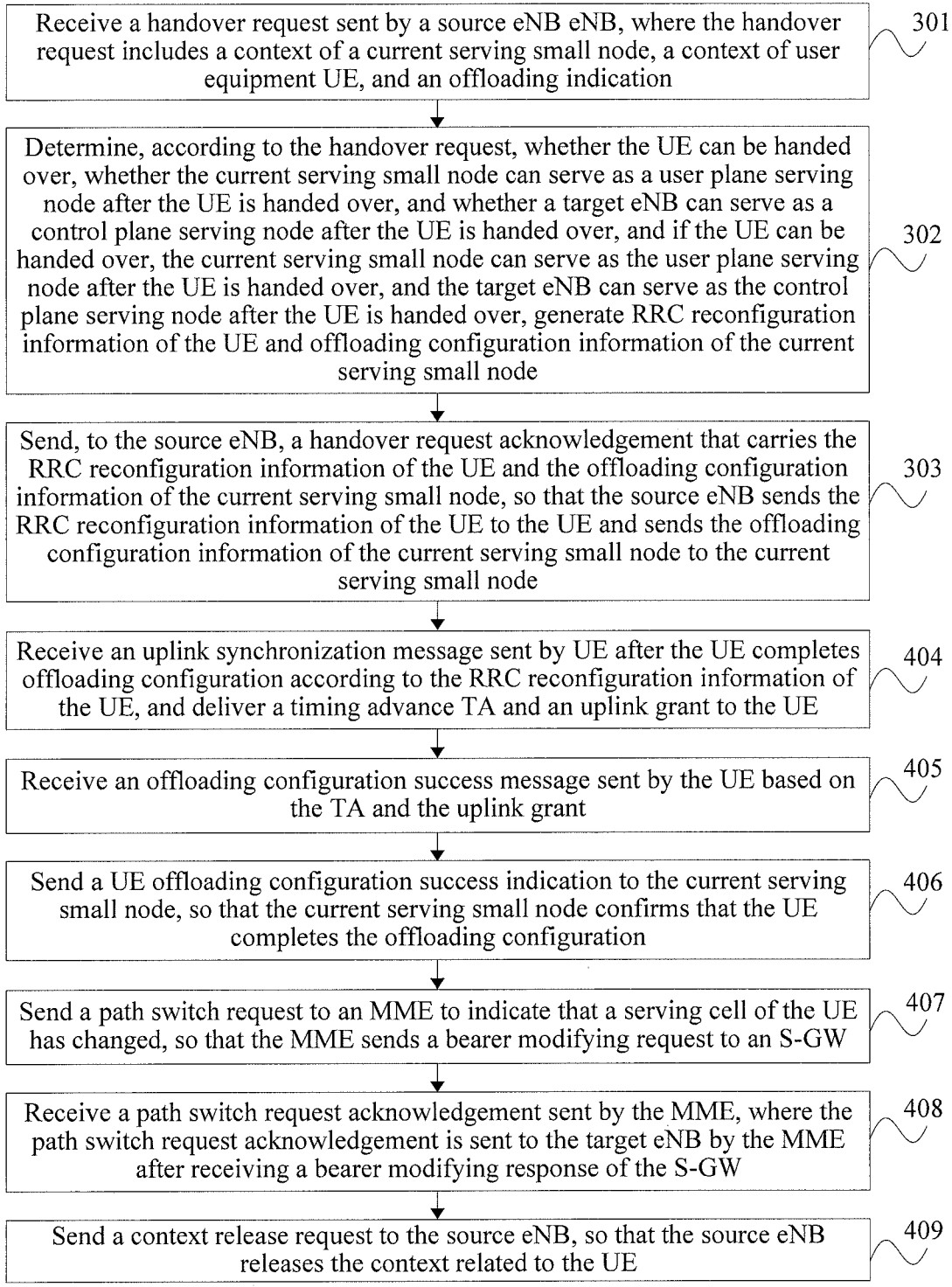
FIG. 4 is a flowchart of Embodiment 4 of a cell handover method according to the present invention.

FIG. 4 is a flowchart of Embodiment 4 of a cell handover method according to the present invention. As shown in FIG. 4, the cell handover method provided in this embodiment is executed by a target eNB, and on the basis of the foregoing embodiment, after step S303, the cell handover method of this embodiment may include:

S404. Receive an uplink synchronization message sent by the UE after the UE completes the offloading configuration according to the RRC reconfiguration information of the UE, and deliver a timing advance TA and an uplink grant to the UE.

Specifically, after completing the offloading configuration, the UE may send the uplink synchronization message to the target eNB by using the access preamble that is in the RRC reconfiguration information and that is exclusive for the target eNB.

S405. Receive an offloading configuration success message sent by the UE based on the TA and the uplink grant.

S406. Send a UE offloading configuration success indication to the current serving small node, so that the current serving small node confirms that the UE completes the offloading configuration.

It should be noted that in this embodiment of the present invention, there are two implementation scenarios. The first scenario is that after completing the offloading configuration, the UE initiates uplink synchronization only to the target eNB; and the second scenario is that after completing the offloading configuration, the UE initiates uplink synchronization to both the target eNB and the current serving small node. In the first scenario, the target eNB executes step S406 after step S405. In the second scenario, the UE sends the offloading configuration success message separately to the target eNB and the current serving small node after the uplink synchronization is completed. Correspondingly, the target eNB does not need to execute step S406.

Specifically, after the target eNB sends the UE offloading configuration success indication to the current serving small node, or after the target eNB and the current serving small node both receive the offloading configuration success message that is sent by the UE after the uplink synchronization is completed, a transmission path of uplink user plane data of the UE is switched to the target eNB.

The target eNB starts to receive the uplink user plane data of the UE sent by the current serving small node, and forwards the uplink user plane data of the UE to an EPC (EPC, Evolved Packet Core).

S407. Send a path switch request to an MME to indicate that a serving cell of the UE has changed, so that the MME sends a bearer modifying request to an S-GW.

S408. Receive a path switch request acknowledgment sent by the MME, where the path switch request acknowledgment is sent to the target eNB by the MME after receiving a bearer modifying response of the S-GW.

Generally, after receiving the path switch request sent by the target eNB, the MME sends the bearer modifying request to the S-GW; after completing a switch of a transmission path of downlink data, the S-GW sends the bearer modifying response to the MME; after receiving the bearer modifying response, the MME sends the path switch request acknowledgment to the target eNB.

S409. Send a context release request to the source eNB, so that the source eNB releases the context related to the UE.

According to the cell handover method provided in this embodiment, on the basis of the foregoing embodiment, a handover request acknowledgment sent by a target eNB to a source eNB carries UE side configuration information related to establishment of a user plane connection to a current serving small node, so that offloading configuration is separately performed by UE the current serving small node. After the UE and the current serving small node complete the offloading configuration, the target eNB sends a context release request, so that the source eNB releases a context related to the UE. In this way, transmission of user plane data is always maintained in the current serving small node, and a control plane is switched from the source eNB to the target eNB, thereby resolving a problem that in a cell handover process, a transmission resource required for transmission increases and a delay is relatively great because the current serving small node forwards a large amount of data to the target eNB.

Figure 5:
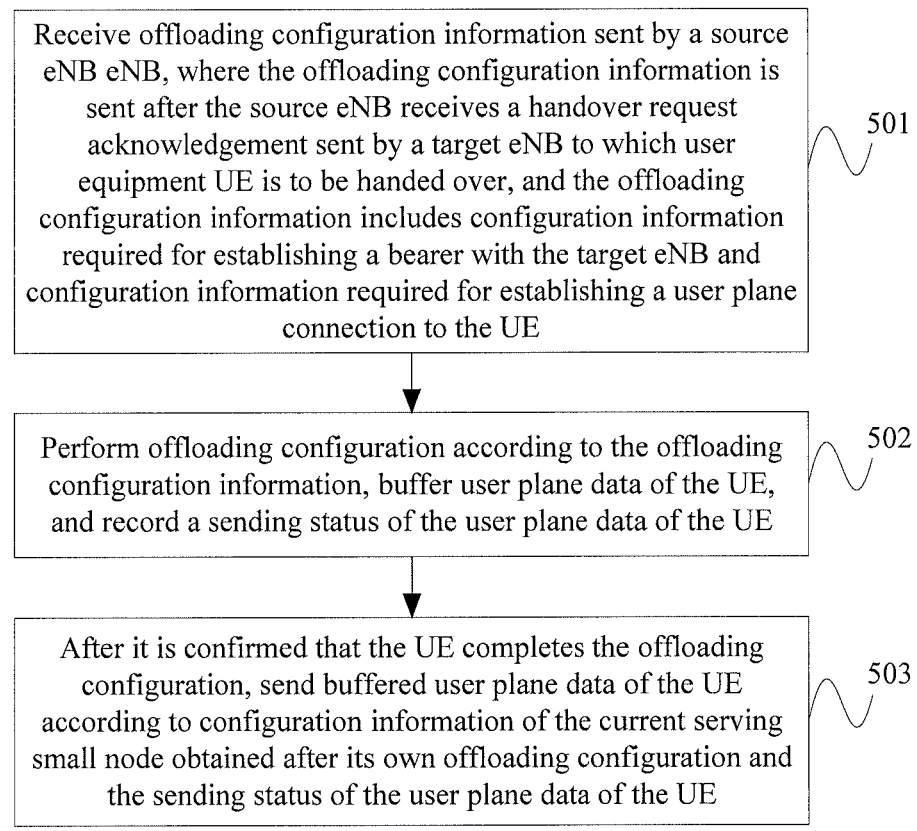
FIG. 5 is a flowchart of Embodiment 5 of a cell handover method according to the present invention.

FIG. 5 is a flowchart of Embodiment 5 of a cell handover method according to the present invention. As shown in FIG. 5, the cell handover method provided in this embodiment is executed by a current serving small node, and the cell handover method of this embodiment may include:

S501. Receive offloading configuration information sent by a source eNB eNB, where the offloading configuration information is sent after the source eNB receives a handover request acknowledgment sent by a target eNB to which user equipment UE is to be handed over, and the offloading configuration information includes configuration information required for establishing a bearer with the target eNB and configuration information required for establishing a user plane connection to the UE.

Specifically, the current serving small node is a small node that currently provides a service for the UE.

S502. Perform offloading configuration according to the offloading configuration information, buffer user plane data of the UE, and record a sending status of the user plane data of the UE.

Specifically, according to the received offloading configuration information, the current serving small node performs corresponding offloading configuration, and stores the sending status of the user plane data of the UE, that is, SN Status information. The SN Status information includes transmission statuses of an uplink packet data convergence protocol serial number (PDCP SN, Packet Data Convergence Protocol Serial Number) receiver and a downlink PDCH SN transmitter, so as to ensure lossless transmission in a handover process, and meanwhile, buffer the user plane data of the UE. The user plane data includes PDCP SDUs and data to which an SN is not allocated, where the PDCP SDU are data to which an SN has already been allocated.

S503. After it is confirmed that the UE completes the offloading configuration, send the buffered user plane data of the UE according to configuration information of the current serving small node obtained after its own offloading configuration and the sending status of the user plane data of the UE.

Specifically, the buffered user plane data of the UE may include buffered uplink user plane data and buffered downlink user plane data, where the buffered downlink user plane data may include downlink user plane data from the source eNB and downlink user plane data from the target eNB.

Further, according to the configuration information of the current serving small node obtained after its own offloading configuration and the sending status of the user plane data of the UE, the current serving small node sends the buffered downlink user plane data to the UE, and sends the buffered uplink user plane data to the target eNB.

When sending the buffered downlink user plane data, the current serving small node first sends, to the UE, the downlink user plane data from the source eNB, and after sending the downlink user plane data from the source eNB is completed, sends, to the UE, the downlink user plane data from the target eNB according to the configuration information of the current serving small node obtained after its own offloading configuration and the sending status of the user plane data of the UE.

According to the cell handover method provided in this embodiment, a small node receives offloading configuration information sent by a source eNB to perform offloading configuration, buffers user plane data of UE, and after it is confirmed that the UE completes the offloading configuration, sends the buffered user plane data of the UE according to configuration information obtained after offloading configuration of the small node and a recorded sending status of the user plane data of the UE, so that transmission of user plane data is always maintained in the current serving small node, and a control plane is switched from a source eNB to the target eNB, thereby resolving a problem that in a cell handover process, a transmission resource required for transmission increases and a delay is relatively great because a current serving small node forwards a large amount of data to the target eNB.

Figure 6:
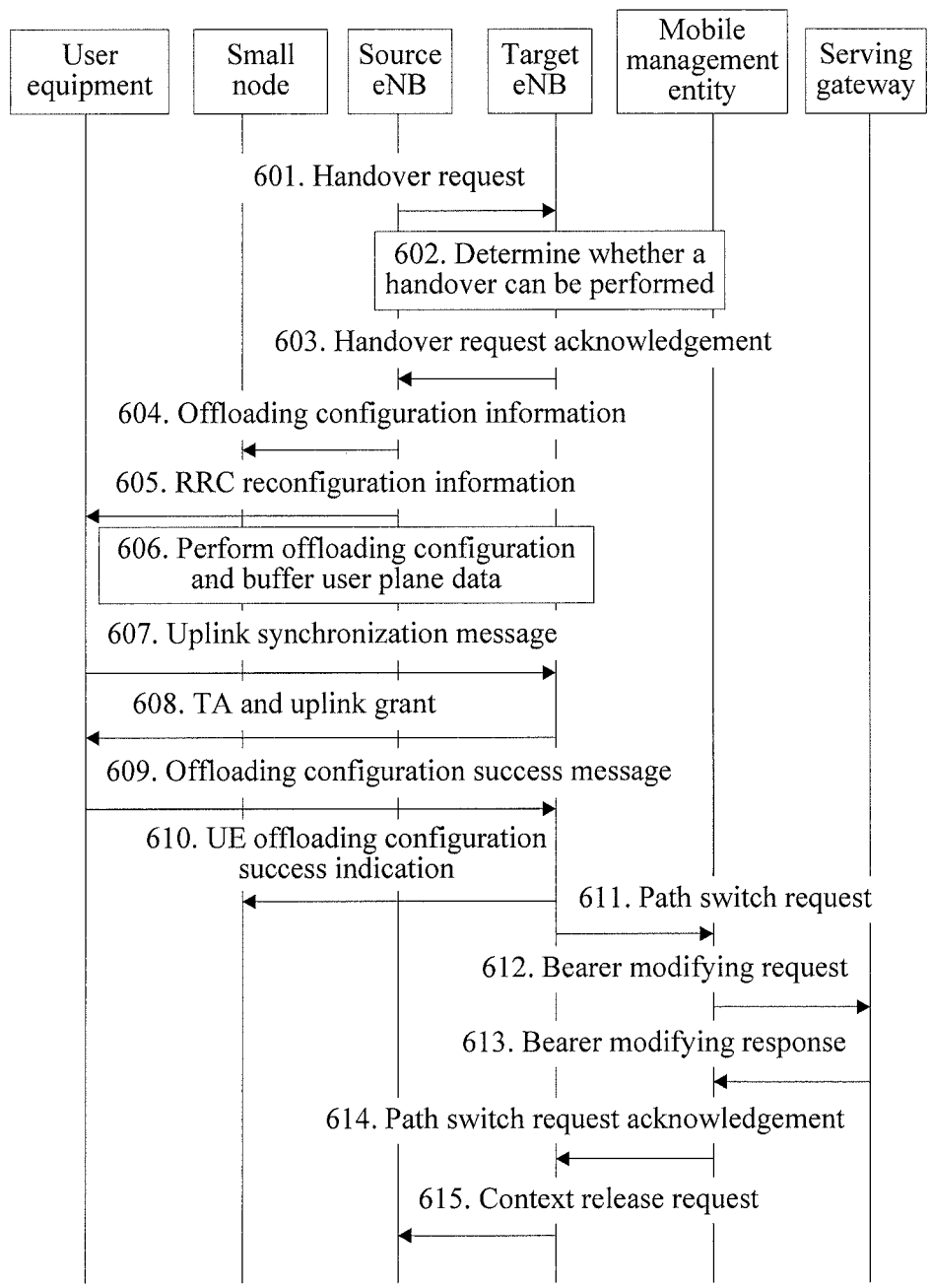
FIG. 6 is a signaling flowchart of an embodiment of a cell handover method according to the present invention.

FIG. 6 is a signaling flowchart of an embodiment of a cell handover method. As shown in FIG. 6, the cell handover method provided in this embodiment includes:

S601. A source eNB sends a handover request to a target eNB.

The source eNB determines, according to a measurement report of UE and RRM information one eNB from a pre-obtained small node sharing list as a target eNB to which the UE is to be handed over, and sends the handover request to the target eNB, where the handover request includes a context of a current serving small node, a context of the UE, and an offloading indication, so that the target eNB uses the current serving small node as a user plane serving node after the UE is handed over, and uses the target eNB as a control plane serving node after the UE is handed over.

S602. The target eNB determines whether a handover can be performed.

After receiving the handover request sent by the source eNB, the target eNB determines whether a handover can be performed, whether the current serving small node can serve as the user plane serving node after the UE is handed over, and whether the target eNB can serve as the control plane serving node after the UE is handed over, and if a handover can be performed, the current serving small node can serve as the user plane serving node after the UE is handed over, and the target eNB can serve as the control plane serving node after the UE is handed over, generates RRC reconfiguration information of the UE and offloading configuration information of the current serving small node.

S603. The target eNB sends a handover request acknowledgment to the source eNB.

The target eNB includes the generated RRC reconfiguration information of the UE and offloading configuration information of the current serving small node in the handover request acknowledgment sent to the source eNB, so that the source eNB sends the RRC reconfiguration information of the UE to the UE, and sends the offloading configuration information of the current serving small node to the current serving small node.

S604. The source eNB sends the offloading configuration information to the current serving small node.

The offloading configuration information sent by the source eNB to the small node may include configuration information required for establishing a user plane connection to the UE and configuration information required for establishing a bearer with the target eNB, so that the small node performs offloading configuration.

S605. The source eNB sends the RRC reconfiguration information to the UE.

The RRC reconfiguration information sent by the source eNB to the UE may include UE side configuration information related to establishment of a user plane connection to the current serving small node and configuration information required for establishing a control plane connection to the target eNB, so that the UE performs offloading configuration.

S604 and S605 may be executed at the same time.

S606. After receiving the offloading configuration information, the small node performs offloading configuration, and buffers user plane data.

The current serving small node performs corresponding offloading configuration according to the received offloading configuration information, and meanwhile, buffers the user plane data of the UE, and stores PDCP SN status information. The PDCP SN status information includes transmission statuses of an uplink PDCP SN receiver and a downlink PDCH SN transmitter, so as to ensure lossless transmission in a handover process.

S607. After completing the offloading configuration, the UE sends an uplink synchronization message to the target eNB.

After completing the offloading configuration, the UE sends the uplink synchronization message to the target eNB by using an access preamble information that is in the RRC reconfiguration information and that is exclusive for the target eNB.

S608. The target eNB sends a TA and an uplink grant to the UE.

After receiving the uplink synchronization message sent by the UE, the target eNB sends the TA and the uplink grant to the UE.

S609. The UE sends an offloading configuration success message to the target eNB.

The UE sends, based on the TA and the uplink grant, the offloading configuration success message to the target eNB.

S610. The target eNB sends a UE offloading configuration success indication to the small node.

So far, a control plane of the UE is switched from the source eNB to the target eNB, whereas transmission of the user plane data is still maintained in the small node.

S611. The target eNB sends a path switch request to an MME.

The target eNB sends the path switch request to the MME, so as to indicate that a serving cell of the UE has changed.

S612. The MME sends a bearer modifying request to an S-GW.

After receiving the path switch request sent by the target eNB, the MME sends the bearer modifying request to the S-GW.

S613. The S-GW sends a bearer modifying response to the MME.

After receiving the bearer modifying request sent by the MME, the S-GW switches a sending path of downlink data to the target eNB.

S614. The MME sends a path switch request acknowledgment to the target eNB.

After receiving the bearer modifying response sent by the S-GW, the MME sends the path switch request acknowledgment to the target eNB.

S615. The target eNB sends a context release request to the source eNB.

After receiving the context release request, the source eNB releases the context related to the UE.

A difference between another scenario and that of FIG. 6 lies in that, the UE initiates uplink synchronization to the current serving small node when executing S607~S609, and sends the offloading configuration success message to the current serving small node. Correspondingly, after S609, the target eNB does not need to execute S610, but directly executes S611.

According to the cell handover method provided in this embodiment, one eNB from a pre-obtained small node sharing list as a target eNB to which UE is to be handed over and sends a handover request to the target eNB, so that the target eNB uses the current serving small node as a user plane serving node after the UE is handed over and uses the target eNB as a control plane serving node after the UE is handed over. In this way, transmission of user plane data is always maintained in the current serving small node, and a control plane is switched from the source eNB to the target eNB, thereby resolving a problem that in a cell handover process, a transmission resource required for transmission increases and a delay is relatively great because the current serving small node forwards a large amount of data to the target eNB.

Figure 7:
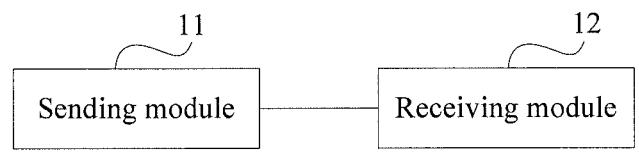
FIG. 7 is a schematic structural diagram of Embodiment 1 of an eNB according to the present invention.

FIG. 7 is a schematic structural diagram of Embodiment 1 of an eNB according to the present invention. As shown in FIG. 7, the eNB provided in this embodiment may include:

a sending module 11, configured to send a handover request to a target eNB, where the handover request includes a context of a current serving small node, a context of UE, and an offloading indication, so that the target eNB uses the current serving small node as a user plane serving node after the UE is handed over, and uses the target eNB as a control plane serving node after the UE is handed over; and a receiving module 12, configured to receive a handover request acknowledgment sent by the target eNB, where the handover request acknowledgment includes radio resource control RRC reconfiguration information of the UE and offloading configuration information of the current serving small node, and the handover request acknowledgment is sent after the target eNB determines that the UE can be handed over, that the current serving small node can serve as the user plane serving node after the UE is handed over, and that the target eNB can serve as the control plane serving node after the UE is handed over; where the sending module 11 is further configured to: send the offloading configuration information of the current serving small node to the current serving small node, and send the RRC reconfiguration information of the UE to the UE, so that offloading configuration is performed separately by the current serving small node and the UE.

Optionally, the eNB further includes: a determining module, configured to determine, according to a measurement report of the UE and RRM information, one eNB from a pre-obtained small node sharing list as the target eNB to which the UE is to be handed over, where the small node sharing list includes IDs of multiple eNBs that share the current serving small node; or configured to determine, according to the measurement report of the UE and the RRM information, one eNB as the target eNB to which the UE is to be handed over.

Further, the context of the current serving small node includes an identity of the current serving small node.

Optionally, the context of the current serving small node further includes:

a use frequency and system information that are of the current serving small node, and a security algorithm supported by the current serving small node.

The eNB in this embodiment may be configured to execute a technical solution in the method embodiment shown in FIG. 1 or FIG. 2, and an implementation principle and a technical effect thereof are similar and are not described herein again.

Figure 8:
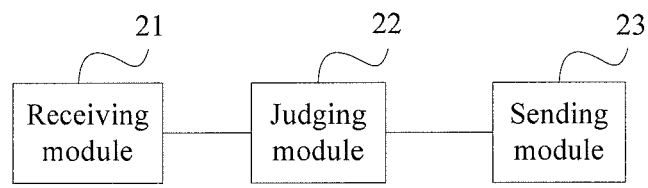
FIG. 8 is a schematic structural diagram of Embodiment 2 of an eNB according to the present invention.

FIG. 8 is a schematic structural diagram of Embodiment 2 of an eNB according to the present invention. As shown in FIG. 8, the eNB provided in this embodiment may include:

a receiving module 21, configured to receive a handover request sent by a source eNB, where the handover request includes a context of a current serving small node, a context of UE, and an offloading indication;

a judging module 22, configured to: determine, according to the handover request, whether the UE can be handed over, whether the current serving small node can serve as a user plane serving node after the UE is handed over, and whether the target eNB can serve as a control plane serving node after the UE is handed over, and if the UE can be handed over, the current serving small node can serve as the user plane serving node after the UE is handed over, and the target eNB can serve as the control plane serving node after the UE is handed over, generate RRC reconfiguration information of the UE and offloading configuration information of the current serving small node; and a sending module 23, configured to send, to the source eNB, a handover request acknowledgment that carries the RRC reconfiguration information of the UE and the offloading configuration information of the current serving small node, so that the source eNB sends the RRC reconfiguration information of the UE to the UE and sends the offloading configuration information of the current serving small node to the current serving small node.

Further, the receiving module 21 is further configured to receive an uplink synchronization message sent by the UE after the UE completes the offloading configuration according to the RRC reconfiguration information of the UE; the sending module 23 is further configured to deliver a timing advance TA and an uplink grant to the UE; the receiving module 21 is further configured to receive an offloading configuration success message that is sent by the UE based on the TA and the uplink grant.

Further, the sending module 23 is further configured to send a UE offloading configuration success indication to the current serving small node, so that the current serving small node confirms that the UE completes the offloading configuration.

The eNB in this embodiment may be configured to execute a technical solution in the foregoing method embodiment shown in FIG. 3 or FIG. 4, and an implementation principle and a technical effect thereof are similar and are not described herein again.

Figure 9:
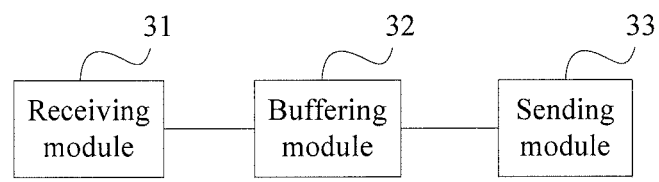
FIG. 9 is a schematic structural diagram of Embodiment 1 of a small node according to the present invention.

FIG. 9 is a schematic structural diagram of Embodiment 1 of a small node according to the present invention. As shown in FIG. 9, the small node provided in this embodiment may include:

a receiving module 31, configured to receive offloading configuration information sent by a source eNB, where the offloading configuration information is sent after the source eNB receives a handover request acknowledgment sent by a target eNB to which UE is to be handed over, and the offloading configuration information includes configuration information required for establishing a bearer with the target eNB and configuration information required for establishing a user plane connection to the UE;

a buffering module 32, configured to: perform offloading configuration according to the offloading configuration information, buffer user plane data of the UE, and record a sending status of the user plane data of the UE; and a sending module 33, configured to: after it is confirmed that the UE completes the offloading configuration, send, according to configuration information obtained after offloading configuration of the small node and the sending status of the user plane data of the UE, the user plane data of the UE buffered by the buffering module 32.

Optionally, the receiving module 31 is further configured to receive a UE offloading configuration success indication sent by the target eNB; correspondingly, the small node further includes: a first confirming module, configured to confirm, according to the UE offloading configuration success indication, that the UE completes the offloading configuration.

Optionally, the receiving module 31 is further configured to receive an uplink synchronization message sent by the UE, and the sending module 33 is further configured to deliver a timing advance TA and an uplink grant to the UE.

The receiving module 31 is further configured to receive an offloading configuration success message sent by the UE based on the TA and the uplink grant.

Correspondingly, the small node further includes: a second confirming module, configured to confirm, according to the offloading configuration success message, that the UE completes the offloading configuration.

Further, the user plane data of the UE buffered by the buffering module 32 includes buffered uplink user plane data and buffered downlink user plane data.

The sending module 33 is specifically configured to: after it is confirmed that the UE completes the offloading configuration, according to the configuration information obtained after the offloading configuration of the small node and the sending status that is of the user plane data of the UE and is recorded by the buffering module 32, send, to the UE, the downlink user plane data buffered by the buffering module 32, and send, to the target eNB, the uplink user plane data buffered by the buffering module 32.

Further, the downlink user plane data buffered by the buffering module 32 includes downlink user plane data from the source eNB and downlink user plane data from the target eNB.

The sending module 33 is specifically configured to: after it is confirmed that the UE completes the offloading configuration, send, to the UE, the downlink user plane data from the source eNB according to the configuration information obtained after the offloading configuration of the small node and the sending status that is of the user plane data of the UE and is recorded by the buffering module 32; and after sending the downlink user plane data from the source eNB is completed, send, to the UE, the downlink user plane data from the target eNB according to the configuration information obtained after the offloading configuration of the small node and the sending status that is of the user plane data of the UE and is recorded by the buffering module 32.

The small node in this embodiment may be configured to execute a technical solution in the foregoing method embodiment shown in FIG. 5, and an implementation principle and a technical effect thereof are similar and are not described herein again.

Figure 10:
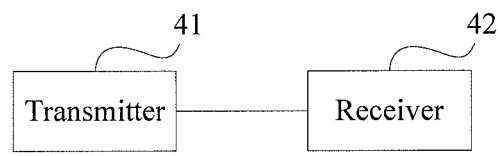
FIG. 10 is a schematic structural diagram of Embodiment 3 of an eNB according to the present invention.

FIG. 10 is a schematic structural diagram of Embodiment 3 of an eNB according to the present invention. As shown in FIG. 10, the eNB provided in this embodiment may include: a transmitter 41 and a receiver 42.

The transmitter 41 is configured to send a handover request to a target eNB eNB, where the handover request includes a context of a current serving small node, a context of user equipment UE, and an offloading indication, so that the target eNB uses the current serving small node as a user plane serving node after the UE is handed over, and uses the target eNB as a control plane serving node after the UE is handed over.

The receiver 42 is configured to receive a handover request acknowledgment sent by the target eNB, where the handover request acknowledgment includes radio resource control RRC reconfiguration information of the UE and offloading configuration information of the current serving small node, and the handover request acknowledgment is sent after the target eNB determines that the UE can be handed over, that the current serving small node can serve as the user plane serving node after the UE is handed over, and that the target eNB can serve as the control plane serving node after the UE is handed over.

The foregoing transmitter 41 is further configured to: send the offloading configuration information of the current serving small node to the current serving small node, and send the RRC reconfiguration information of the UE to the UE, so that offloading configuration is performed separately by the current serving small node and the UE.

Further, a processor is further configured to determine, according to a measurement report of the UE and RRM information one eNB from a pre-obtained small node sharing list as the target eNB to which the UE is to be handed over, where the small node sharing list includes IDs of multiple eNBs that share the current serving small node; or configured to determine, according to the measurement report of the UE and the RRM information, one eNB as the target eNB to which the UE is to be handed over.

Further, the context of the current serving small node includes an identity of the current serving small node.

Optionally, the context of the current serving small node further includes:

a use frequency and system information that are of the current serving small node, and a security algorithm supported by the current serving small node.

The eNB in this embodiment may be configured to execute a technical solution in the foregoing method embodiment shown in FIG. 1 or FIG. 2, and an implementation principle and a technical effect thereof are similar and are not described herein again.

Figure 11:
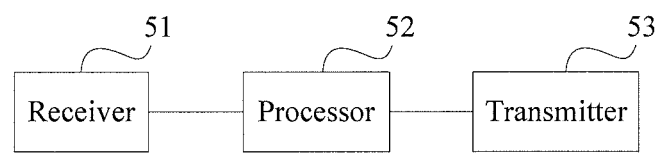
FIG. 11 is a schematic structural diagram of Embodiment 4 of an eNB according to the present invention.

FIG. 11 is a schematic structural diagram of Embodiment 4 of an eNB according to the present invention. As shown in FIG. 11, the eNB provided in this embodiment may include: a receiver 51, a processor 52, and a transmitter 53.

The receiver 51 is configured to receive a handover request sent by a source eNB eNB, where the handover request includes a context of a current serving small node, a context of user equipment UE, and an offloading indication.

The processor 52 is configured to: determine, according to the handover request, whether the UE can be handed over, whether the current serving small node can serve as a user plane serving node after the UE is handed over, and whether the target eNB can serve as a control plane serving node after the UE is handed over, and if the UE can be handed over, the current serving small node can serve as the user plane serving node after the UE is handed over, and the target eNB can serve as the control plane serving node after the UE is handed over, generate RRC reconfiguration information of the UE and offloading configuration information of the current serving small node.

The transmitter 53 is configured to send, to the source eNB, a handover request acknowledgment that carries the RRC reconfiguration information of the UE and the offloading configuration information of the current serving small node, so that the source eNB sends the RRC reconfiguration information of the UE to the UE, and sends the offloading configuration information of the current serving small node to the current serving small node.

Further, the foregoing receiver 51 is further configured to receive an uplink synchronization message by the UE after the UE completes offloading configuration according to the RRC reconfiguration information of the UE; the transmitter 53 is further configured to deliver a timing advance TA and an uplink grant to the UE; the foregoing receiver 51 is further configured to receive an offloading configuration success message sent by the UE based on the TA and the uplink grant.

Further, the foregoing transmitter 53 is further configured to send a UE offloading configuration success indication to the current serving small node, so that the current serving small node confirms that the UE completes the offloading configuration.

The eNB in this embodiment may be configured to execute a technical solution in the foregoing method embodiment shown in FIG. 3 or FIG. 4, and an implementation principle and a technical effect thereof are similar and are not described herein again.

Figure 12:
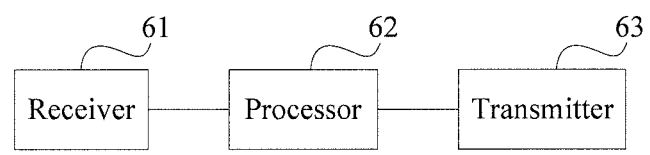
FIG. 12 is a schematic structural diagram of Embodiment 2 of a small node according to the present invention.

FIG. 12 is a schematic structural diagram of Embodiment 2 of a small node according to the present invention. As shown in FIG. 12, the small node provided in this embodiment may include: a receiver 61, a processor 62, and a transmitter 63.

The receiver 61 is configured to receive offloading configuration information sent by a source eNB eNB, where the offloading configuration information is sent after the source eNB receives a handover request acknowledgment sent by a target eNB to which user equipment UE is to be handed over, and the offloading configuration information includes configuration information required for establishing a bearer with the target eNB and configuration information required for establishing a user plane connection to the UE.

The processor 62 is configured to: perform offloading configuration according to the offloading configuration information, buffer user plane data of the UE, and record a sending status of the user plane data of the UE.

The transmitter 63 is configured to: after it is confirmed that the UE completes the offloading configuration, send, according to configuration information obtained after offloading configuration of the small node and the sending status of the user plane data of the UE, the user plane data of the UE buffered by the processor 62.

Optionally, the receiver 61 is further configured to receive a UE offloading configuration success indication sent by the target eNB; correspondingly, the processor 62 is further configured to confirm, according to the UE offloading configuration success indication, that the UE completes the offloading configuration.

Optionally, the receiver 61 is further configured to receive an uplink synchronization message sent by the UE, and the transmitter 63 is further configured to deliver a timing advance TA and an uplink grant to the UE.

The receiver 61 is further configured to receive an offloading configuration success message sent by the UE based on the TA and the uplink grant.

Correspondingly, the processor 62 is further configured to confirm, according to the offloading configuration success message, that the UE completes the offloading configuration.

Further, the user plane data of the UE buffered by the processor 62 includes buffered uplink user plane data and buffered downlink user plane data.

The transmitter 63 is specifically configured to: after it is confirmed that the UE completes the offloading configuration, according to the configuration information obtained after the offloading configuration of the small node and the sending status that is of the user plane data of the UE and is recorded by the processor 62, send, to the UE, the downlink user plane data buffered by the processor 62, and send, to the target eNB, the uplink user plane data buffered by the processor 62.

Further, the downlink user plane data buffered by the processor 62 includes downlink user plane data from the source eNB and downlink user plane data from the target eNB.

The transmitter 63 is specifically configured to: after it is confirmed that the UE completes the offloading configuration, send, to the UE, the downlink user plane data from the source eNB according to the configuration information obtained after the offloading configuration of the small node and the sending status that is of the user plane data of the UE and is recorded by the processor 62; and after sending the downlink user plane data from the source eNB is completed, send, to the UE, the downlink user plane data from the target eNB according to the configuration information obtained after the offloading configuration of the small node and the sending status that is of the user plane data of the UE and is recorded by the processor 62.

The small node in this embodiment may be configured to execute a technical solution in the foregoing method embodiment shown in FIG. 5, and an implementation principle and a technical effect thereof are similar and are not described herein again.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    sending, by a source base station, a handover request to a target base station, wherein the handover request comprises an identity of a current serving node and an information element that is used to uniquely define, on an interface between the current serving node and the source base station, a serial number of a user equipment (UE), wherein the current serving node is an access node of a cell;
    receiving, by the source base station, a handover request acknowledgment from the target base station, wherein the handover request acknowledgment comprises radio resource control (RRC) reconfiguration information of the UE and configuration information of the current serving node;
    sending, by the source base station, the configuration information of the current serving node to the current serving node to maintain transmission of user plane data in the current serving node, and sending the RRC reconfiguration information of the UE to the UE; and
    receiving, by the source base station, a context release request from the target base station.

2. The method according to claim 1, after the receiving a context release request from the target base station, comprising:
    sending, by the source base station, a resource release request to the current serving node for releasing a resource that is established with the source base station and that is related to the UE.

3. An apparatus, comprising:
    a memory storing program instructions; and
    a processor coupled to the memory;
    wherein when executed by the processor, the instructions cause the apparatus to:
    send a handover request to a target base station, wherein the handover request comprises an identity of a current serving node and an information element that is used to uniquely define, on an interface between the current serving node and a source base station, a serial number of a user equipment (UE), wherein the current serving node is an access node of a cell;
    receive a handover request acknowledgment from the target base station, wherein the handover request acknowledgment comprises radio resource control (RRC) reconfiguration information of the UE and configuration information of the current serving node;
    send the configuration information of the current serving node to the current serving node to maintain transmission of user plane data in the current serving node, and send the RRC reconfiguration information of the UE to the UE; and
    receive a context release request from the target base station.

4. The apparatus according to claim 3, wherein the instructions further cause the apparatus to: send a resource release request to the current serving node for releasing a resource that is established with the source base station and that is related to the UE.

5. The method according to claim 1, further comprising:
    in response to the receiving of the handover request, generating, by the target base station, the RRC reconfiguration information of the UE and the configuration information of the current serving node; and
    sending, by the target base station, the handover request acknowledgment to the source base station.

6. The method according to claim 5, further comprising:
    receiving, by the target base station, a configuration success message from the UE; and
    sending, by the target base station, a configuration success indication to the current serving node to inform that the UE completes configuration.

7. The method according to claim 1, further comprising:
    performing configuration based on the configuration information of the current serving node, by the current serving node, to maintain transmission of user plane data in the current serving node after the UE is handed over from the source base station to the target base station.

8. The method according to claim 7, further comprising:
    receiving, by the current serving node, a configuration success indication from the target base station, wherein the configuration success indication is used to inform that the UE completes configuration.

9. The method according to claim 7, further comprising:
    receiving, by the current serving node, a resource release request from the source base station; and
    releasing, by the current serving node, a resource that was established with the source base station and that is related to the UE.

10. A communications system comprising a source base station, a target base station and a serving node, wherein
    the source base station is configured to send a handover request to the target base station, wherein the handover request comprises an identity of the serving node and an information element that is used to uniquely define, on an interface between the serving node and the source base station, a serial number of a user equipment (UE), wherein the serving node is an access node of a cell;
    the target base station is configured to in response to the receiving of the handover request, generate a radio resource control (RRC) reconfiguration information of the UE and configuration information of the serving node, and send a handover request acknowledgment to the source base station, wherein the handover request acknowledgment comprises the RRC reconfiguration information of the UE and the configuration information of the serving node;
    the source base station is further configured to send the configuration information of the serving node to the serving node, and send the RRC reconfiguration information of the UE to the UE;
    the serving node is configured to perform configuration based on the configuration information of the serving node to maintain transmission of user plane data in the serving node after the UE is handed over from the source base station to the target base station; and
    the target base station is further configured to send a context release request to the source base station.

11. The system according to claim 10, wherein
the target base station is further configured to receive a configuration success message from the UE, and send a configuration success indication to the serving node to inform that the UE completes configuration.

12. The system according to claim 10, wherein
the source base station is further configured to send a resource release request to the serving node; and
the serving node is further configured to, in response to the resource release request, release a resource that was established with the source base station and that is related to the UE.

13. A non-transitory computer-readable storage medium comprising instructions which, when executed by a computer hardware of network device, cause the network device to:
send a handover request to a target base station, wherein the handover request comprises an identity of a current serving node and an information element that is used to uniquely define, on an interface between the current serving node and a source base station, a serial number of a user equipment (UE), wherein the current serving node is an access node of a cell;
receive a handover request acknowledgment from the target base station, wherein the handover request acknowledgment comprises radio resource control (RRC) reconfiguration information of the UE and configuration information of the current serving node;
send the configuration information of the current serving node to the current serving node to maintain transmission of user plane data in the current serving node, and send the RRC reconfiguration information of the UE to the UE; and
receive a context release request from the target base station.

14. The non-transitory computer-readable storage medium according to claim 13, wherein the instructions, when executed by the computer hardware, further cause the network device to:
send a resource release request to the current serving node for releasing a resource that is established with the source base station and that is related to the UE.

* * * * *